US 6,667,970 B1

(12) United States Patent
Abe

(10) Patent No.: US 6,667,970 B1
(45) Date of Patent: Dec. 23, 2003

(54) TRADING CALL SYSTEM AND METHOD OF REMOTE-CONTROLLING THE SAME

(75) Inventor: Isamu Abe, Koriyama (JP)

(73) Assignee: Hitachi Communication Technologies Ltd., Fukushima-ken (JP)

(*) Notice: Subject to any disclaimer, the term of this patent is extended or adjusted under 35 U.S.C. 154(b) by 0 days.

(21) Appl. No.: 09/409,076

(22) Filed: Sep. 30, 1999

(51) Int. Cl.[7] ............................................... H04L 12/28
(52) U.S. Cl. ...................................... 370/352; 370/437
(58) Field of Search ............................. 370/352, 355, 370/356, 401, 402, 437, 465, 467, 493, 357, 431; 705/35–40, 64

(56) References Cited

U.S. PATENT DOCUMENTS 5,956,391 A * 9/1999 Melen et al. ............... 379/114
6,226,623 B1 * 5/2001 Schein et al. ................ 705/35
6,263,000 B1 * 7/2001 Kokubun ..................... 370/522

* cited by examiner

Primary Examiner—Wellington Chin
Assistant Examiner—Brenda Pham
(74) Attorney, Agent, or Firm—Antonelli, Terry, Stout, & Kraus, LLP

(57) ABSTRACT

The trading call system includes a circuit control unit, connected to a plurality of trunk circuits and a plurality of line circuits 11. The trunk circuits are connected to telephone circuits, while the line circuits are connected to trading call terminal devices. A first internet circuit connecting adapter 31 is connected to some line circuits, and a LAN is connected to the circuit control unit through the adapters. A network server and a router are connected to the LAN, and an internet 40 is connected to the LAN through the router. A PC and a second internet connecting adapter are connected to the internet, and one or more trading call terminal devices are connected to the second internet connecting adapter.

2 Claims, 3 Drawing Sheets

TRADING CALL SYSTEM AND METHOD OF REMOTE-CONTROLLING THE SAME

FIELD OF THE INVENTION

The present invention relates to a trading call system to be used for carrying out financial transactions in financial institutions such as a bank or a brokerage and the like, including a plurality of trading call terminal devices stored and connected to a circuit control unit.

Further, the present invention relates to a method of remote-controlling a trading call system, wherein the storage position data or the extension number data of the circuit control unit or the screen data of the trading call terminal devices connected to the circuit control unit may be changed from a personal computer connected to the internet, through the network server connected to a local area network (LAN) and the LAN.

Moreover, the present invention relates to a trading call system in which a trading call terminal device connected to the internet (for example, an open computer network OCN) is installed at home, and an incoming call to a trading call terminal device stored in the circuit control unit is transferred through the internet to the trading call terminal device installed at home, so as to enable communication between the in-home terminal and a calling terminal of the caller connected to the circuit control unit for example.

DESCRIPTION OF THE RELATED ART

With reference to FIG. 4, a prior art trading call system including a plurality of trading call terminal devices stored in a circuit control unit, and a prior art method of setting the storage position data or the extension number data of the trading call terminal device or setting the screen data of the trading call terminal devices is explained.

The prior art trading call system comprises a circuit control unit 10, a plurality of line interface circuits (hereinafter called line circuits) 11 stored to the circuit control unit 10, trading call terminal devices 21 connected to the line circuits, a plurality of trunk circuits 12 stored to the circuit control unit 10 and connected to public circuits or private circuits, a remote administration trunk circuit 13 connected to an external remote administration center, and a local data administration means 50 for administering the local data related to the trading call terminal devices and the like stored to the circuit control unit 10.

The communication with the circuit control unit 10 is performed by the following method. First, a personal computer is installed to an external remote administration center and the like, and through the personal computer, a circuit control unit maintenance program is started. Thereby, the storage position data or the extension number data of the circuit control unit 10 may be remote-controlled through the remote administration trunk circuit 13, and the disorder of the circuit control unit 10 is notified to the personal computer installed to the external remote administration center.

Further, a local data administration means 50 is equipped to every circuit control unit 10 (or in other words, to each local office), so as to enable setting of the storage position data or the extension number data of the circuit control unit 10 from the local data administering personal computer 52 of the local data administration means 50 through a terminal adapter 51 and a personal computer interface unit 14. Moreover, the screen data (for example, the abbreviation dial data and the like) of the trading call terminal devices 21 may be set from the local data administration means 50.

The personal computer interface unit 14 is the line circuit for an ISDN (integrated service digital network) terminal device.

According to such a communication system, the local data administering personal computer 52 prepares in advance a plurality of screen data patterns for every trading call terminal device 21. When a trading call terminal device is relocated, the personal computer receives the storage position data and the extension number data related to the call terminal from the circuit control unit 10, and creates a new storage position data and a new extension number data after the relocation, and transmits the data to the circuit control unit 10.

In the above method, the setting of data from the external remote administration center is performed through an analog circuit. The screen data for each trading call terminal device 21 is set from a local data administering personal computer 52 or a terminal adapter 51 set inside a local machine room and the like where the circuit control unit 10 is installed.

Accordingly, there was a need to install a local data administrating personal computer 52 and the like to every local office, and when performing relocation, the operator had to go to the local office and to set the relocation data from the local data administrating personal computer 52 installed to the machine room of every office.

Recently, there also is a need to install the trading call terminal device included in the trading call system to the home of a broker and the like, and to transfer the incoming call received by the circuit control unit 10 to the trading call terminal device installed at home, so as to enable the broker and the like to communicate through the in-home trading call terminal device.

SUMMARY OF THE INVENTION

The present invention aims at solving the above problems. The object of the present invention is to provide a trading call system which will not need a local data administering personal computer 52 to be installed to every local office. Instead, the storage position data or the extension number data of each local office and the screen data of each trading call terminal device may be set from a personal computer connected to the internet, through the network server connected to a network.

Moreover, the present invention relates to a method of remote-controlling a trading call system which includes a trading call terminal device not directly stored to the circuit control unit, and in which the incoming call to the trading call terminal device stored to the circuit control unit is transferred to the trading call terminal device not directly connected and stored to the circuit control unit, so as to enable communication between the remote trading call terminal device and the call terminal device of the calling party.

Even further, the present invention aims at providing a system which enables to administer and control the trading call terminal device not directly connected to the circuit control unit from a network server administering means installed at a remote site.

In order to solve the above-mentioned problem, the present invention provides a trading call system comprising a circuit control unit to which are stored and connected a plurality of trunk circuits connected to a telephone circuit and a plurality of line circuits, trading call terminals connected to said line circuits, internet circuit connecting adapters connected to said line circuits, a local area network connected to said circuit control unit through said internet circuit connecting adapters and to which is connected a network server, a terminal adapter or router connecting said local area network to the internet, and a personal computer connected to said internet.

Further, the present invention provides a method of remote-controlling the trading call system disclosed above, wherein a storage position data or an extension number data of said circuit control unit or a screen data of said trading call terminal device may be changed from said personal computer connected to said internet through said network server and said local area network.

The present invention also provides a trading call system comprising a circuit control unit to which are stored and connected a plurality of trunk circuits connected to a telephone circuit and a plurality of line circuits, trading call terminals connected to said line circuits, a first internet circuit connecting adapter connected to said line circuit, a local area network connected to said circuit control unit through said first internet circuit connecting adapter and to which is connected a network server, a terminal adapter or router connecting said local area network to the internet, a second internet circuit connecting adapter connected to said internet, and a trading call terminal device connected to said second internet circuit connecting adapter.

Further, the present invention provides a method of remote-controlling the trading call system mentioned above utilizing an internet circuit, wherein a transfer location data of an incoming call is registered to said circuit control unit, and the incoming call received from a telephone circuit by said circuit control unit is transferred through said local area network and said internet to said trading call terminal device connected to said internet.

According to the method of remote-controlling the trading call system of the present invention, the storage position data and the extension number data of the circuit control unit, and the screen data of each trading call terminal device connected to the line circuit of the circuit control unit are stored to the network server connected to the LAN, and the data stored to the network server related to each circuit control unit or each trading call terminal device may be controlled from a remote site by the personal computer connected to the internet.

Further, by connecting the internet circuit connecting adapter to the internet circuit connected to the internet, a trading call may be performed from the terminal installed at home.

PREFERRED EMBODIMENT OF THE INVENTION

The structure of the trading call system and the method of remote-controlling said system according to the present invention will now be explained with reference to the drawings.

Figure 1:
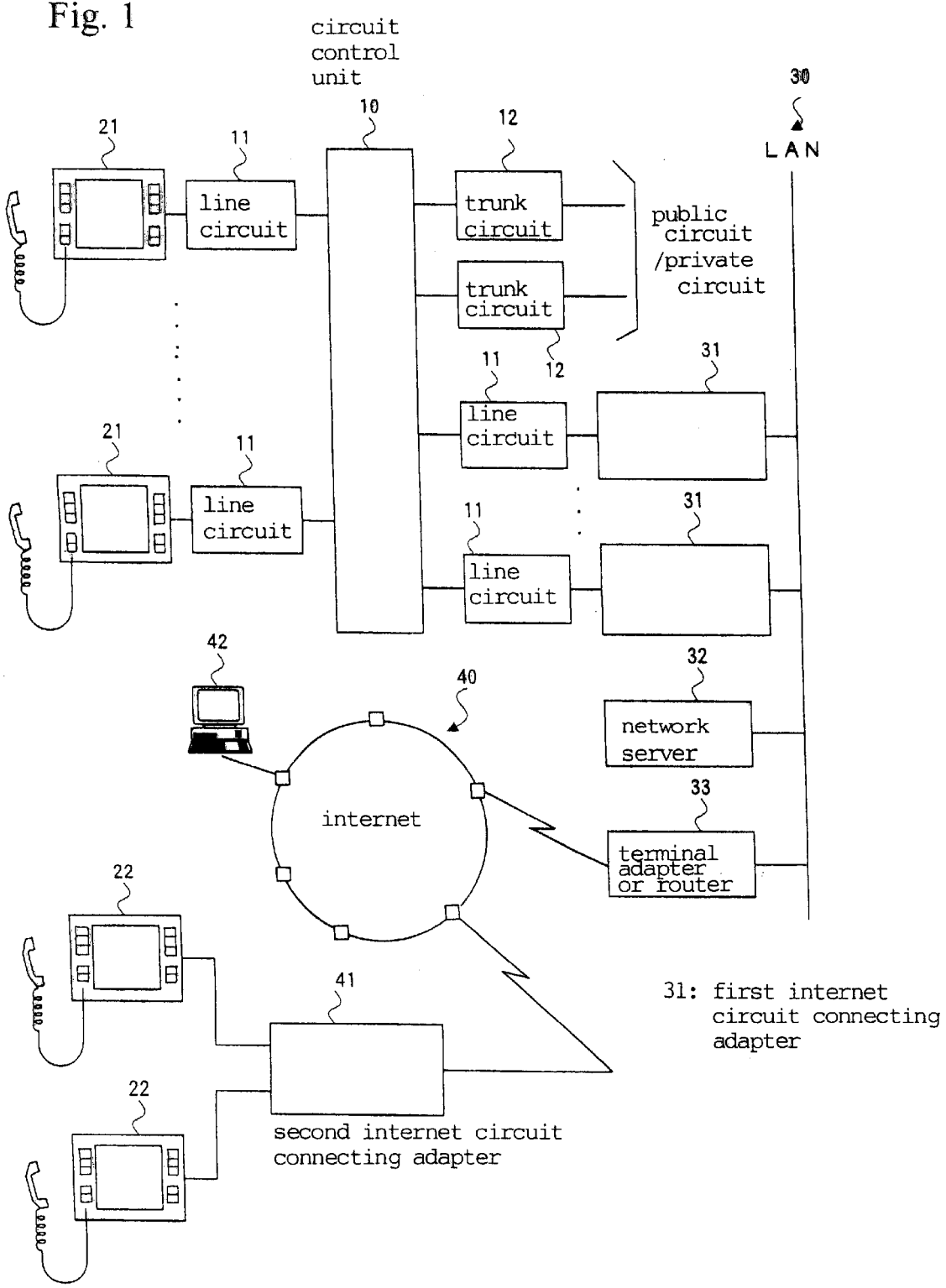
FIG. 1 is a block diagram showing the general structure of the trading call system according to the present invention.

FIG. 1 is a block diagram showing the general structure of the trading call system according to the invention.

The trading call system according to the present invention includes a circuit control unit 10 storing a plurality of line circuits 11 and a plurality of trunk circuits 12. The trunk circuits are connected to local lines such as a public circuit or a private circuit or the like. The trading call system further includes trading call terminal devices 21 connected through line circuits 11 to the circuit control unit, a local area network (LAN) 30 connected through the line circuit 11 to the circuit control unit, an internet 40 (for example, an open computer network OCN) connected to the local area network (LAN) 30, a trading call terminal device 22 connected to the internet 40, and a personal computer 42 connected to the internet 40.

The circuit control unit 10 comprises at least the following connecting functions:

1) a function to connect the local line and the trading call terminal devices 21 based on the storage position data of the trading call terminal devices 21;

3) a function to connect a stored trading call terminal device 21 to other stored trading call terminal devices based on the storage position data of the trading call terminal devices 21;

3) a function to connect the trading call terminal device 21 to a local area network (LAN) 30 based on the storage position data of the trading call terminal devices 21 and internet circuit connecting adapters 31;

4) a function to connect the trading call terminal device 21 to the trading call terminal device 22 through the local area network LAN 30 and the internet 40 based on the storage position data and the like of the trading call terminal devices 21 and the internet circuit connecting adapters 31;

5) a function to connect the call addressed to the trading all terminal device 21 received from the local line to the trading call terminal device 22 based on the data registered thereto in advance; and 6) a function to connect a call generated from the trading call terminal device 22 through the internet 40 and the local area network (LAN) 30 to the local line.

A plurality of trading call terminal devices 21 are each connected to a line circuit 11. A number of line circuits 11 of the plurality of circuits 11 are connected to a local area network (LAN) 30 through first internet circuit connecting adapters 31.

Trunk circuits 12 are connected to local lines such as a public circuit or a private circuit.

Each trading call terminal device 21 is connected to the line circuit 11, and comprises buttons corresponding to extension lines and local lines. The trading call terminal device 21 is capable of transmitting calls to another party (for example, other stock-brokers), or receiving calls therefrom.

A trading call terminal device 22 formed similarly as the trading call terminal device 21 is connected to the internet 40 through a second internet circuit connecting adapter 41.

The trading call terminal devices 22 are not stored directly to the circuit control unit 10, but instead, they are connected to the circuit control unit 10 through the internet 40 and the local area network (LAN) 30. The trading call terminal devices 22 are installed, for example, to the homes of stock-brokers.

The local area network (LAN) 30 is connected through the first internet circuit connecting adapters 31 to the line circuits 11 of the circuit control unit 10, and is further connected through a terminal adapter or router 33 to the internet. Moreover, a network server 32 is stored to the local area network (LAN) 30.

A first internet circuit connecting adapter 31 converts the data from the circuit control unit 10 to a protocol for the local area network (LAN) 30, and enables voice and data to be communicated over the network.

A network server 32 is connected to the local area network (LAN) 30, and stores data related to the network such as the storage position data or the extension number data of the circuit control unit 10, or the screen data of the trading call terminal devices. Further, the server 32 transmits the stored data over the network. A personal computer 42 connected to the internet 40 order s the network server 32 to perform the above-mentioned actions through the internet 40 and the local area network (LAN) 30.

The terminal adapter or router 33 controls the network circuit connected to the local area network (LAN) 30, and sends or receives data over the internet to or from other parties connected to the internet.

The internet 40 is a general communication network, performing communication according to an internet protocol (IP), to which the second internet circuit connecting adapter 41, the personal computer 42 and the like are connected.

The second internet circuit connecting adapter 41 connects the trading call terminal device to the internet 40, thereby enabling an in-home trading.

Figure 2:
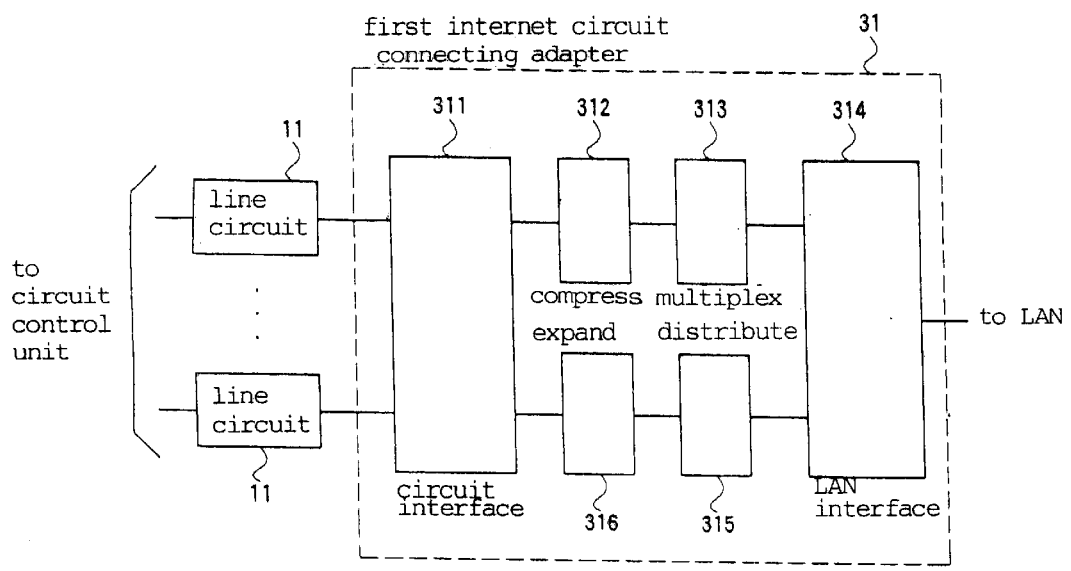
FIG. 2 is a block diagram showing the general structure of the first internet circuit connecting adapter according to the present invention.

The personal computer 42 acts as a data administration unit for administering the circuit control unit 10 and the like through the internet 40 and the local area network (LAN) 30 connected to the internet. The personal computer 42 is capable of ordering a plurality of network servers 32 each stored to one or more local area networks (LAN) 30 connected to the internet 40 to carry out a process such as data administration The structure of the first internet circuit connecting adapter 31 is explained with reference to FIG. 2.

The first internet circuit connecting adapter 31 comprises a circuit interface 311, a compressing unit 312, a multiplexing unit 313, a local area network (LAN) interface 314, a distributing unit 315, and an expanding unit 316.

The first internet circuit connecting adapter 31 receives data from the local area network (LAN) 30 at the local area network (LAN) interface 314, distributes the received multiplexed signal for each circuit by the distributing unit 315, and expands the compressed data at the expanding unit 316. Then, the data is transmitted from the circuit interface 311 to each circuit, and through the line circuit 11 of the circuit control unit 10, the data is transmitted to the trading call terminal device 21.

Further, the first internet circuit connecting adapter 31 receives the data from the trading call terminal device 21 at the circuit interface 311, compresses the received data at the compressing unit 312, multiplexes the same at the multiplexing unit 313, and then carries out an IP connection with a device installed to the local area network (LAN) 30 through the local area network (LAN) interface 314, or with a device connected to the internet 40 through the terminal adapter or router 33.

Figure 3:
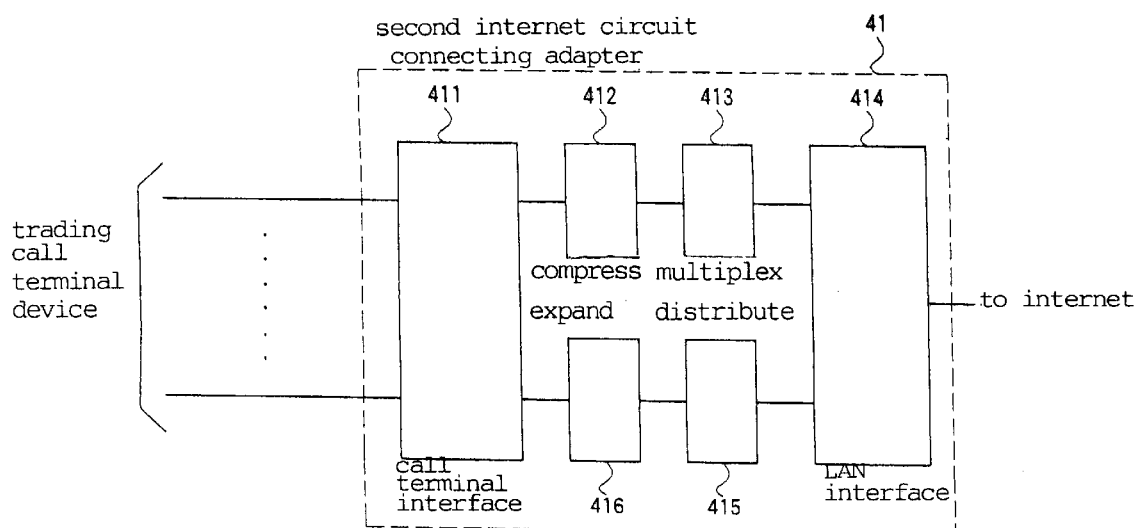
FIG. 3 is a block diagram showing the general structure of the second internet circuit connecting adapter according to the present invention.
Figure 4:
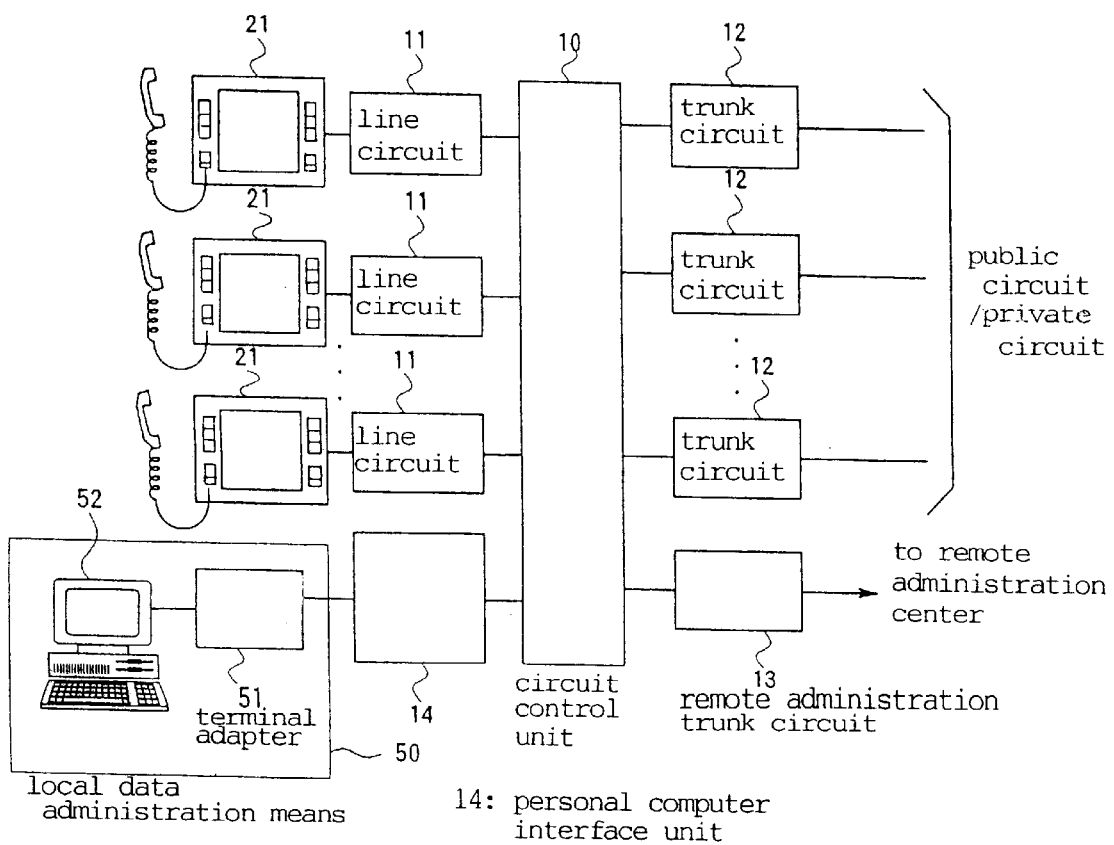
FIG. 4 is a block diagram showing the general structure of the trading call system of the prior art.

The general structure of the second internet circuit connecting adapter will now be explained with reference to the block diagram shown in FIG. 3.

The second internet circuit connecting adapter 41 comprises a call device interface 411, a compressing unit 412, a multiplexing unit 413, a local area network (LAN) interface 414, a distributing unit 415, and an expanding unit 416.

When compared to the first internet circuit connecting adapter 31, the second internet circuit connecting adapter 41 is characterized in including a call terminal interface 411 instead of the circuit interface 311. This is for directly connecting trading call terminal devices (call terminals) 22 to the second internet circuit connecting adapter 41.

Similarly as the first internet circuit connecting adapter 31, the second internet circuit connecting adapter 41 compresses the data received from each trading all terminal device 22, multiplexes the data, and transmits the data to the internet 40 through the local area network (LAN) interface 414. As explained, by compressing and multiplexing the data from the circuit and transmitting the same through the internet 40, the toll for using the circuits may be cut down.

Next, the method of setting the storage position data or the extension number data of the circuit control unit 10 in each local office, and the method of setting the screen data of the trading call terminal device 21 connected to the circuit control unit 10, from the personal computer 42 connected to the internet 40 or the network server 32 of the local area network (LAN) 30 according to the present trading call system will be explained.

The personal computer 42 connected to the internet 40 performs a dialup IP connection or a private line IP connection to the internet 40, and the computer will be connected to the network server 32 of the local area network (LAN) 30 through the terminal adapter or router 33. The personal computer 42 collects various data related to each of the circuit connecting unit 10, the trading call terminal devices 21 and the trading call terminal devices 22, and stores the data to the network server 32. Moreover, the computer 42 transmits the various data related to the circuit control unit 10 and the trading call terminal devices 21 stored to the network server 32 to the circuit control unit 10 or the trading call terminal devices 21 through the first internet circuit connecting adapter 31 connected to the line circuit 11. The various data related to the trading call terminal devices 22 are transmitted to the trading call terminal devices 22 through the terminal adapter or router 33, the internet 40, and the second internet circuit connecting adapter 41.

As explained above, the network server 32 or the personal computer 42 is connected through the local area network (LAN) 30 to the circuit control unit 10 and the trading call terminal devices 21. Therefore, the data related to each office such as the storage position data or the extension number data, or the screen data of the trading call terminal devices 21, may be set as mentioned above.

Next, the method of remote-controlling through the internet circuit the trading call terminal device 22 installed at home and not directly stored to the circuit control unit 10 will be explained.

The trading call terminal device 22 installed at home has the exact same structure as the trading call terminal device 21 connected to the circuit control unit through the line circuit 11, except that the power to the terminal 22 is supplied from an in-home local power source.

The personal computer 42 connected to the internet 40 either performs a dialup IP connection or a private line IP connection to the internet 40, which will be connected to the network server 32 of the local area network (LAN) 30 through the terminal adapter or router 33. The personal computer 42 transmits the various data of the trading call terminal device 22 stored to the network server 32 through the terminal adapter or router 33, the internet 40, and the second internet line connecting adapter 41 to the trading call terminal device 22.

Thereby, the network server 32 or the personal computer 42 may be connected to the trading call terminal device 22 through the local area network (LAN) 30 and the internet 40, and the storage position data or the extension number data of each office, or the screen data of the trading call terminal device 22 may be set through the computer 42 and the like.

Next, when generating a call from the trading call terminal device 22 installed at home and connected to the second internet circuit connecting adapter 41, the second adapter 41 transmits the receiver dial data transmitted from the trading call terminal device 22 through the local area network (LAN) interface to the internet 40. The internet 40 performs a dialup IP connection or a private line IP connection based on the receiver dial data, forms a path over the network 30 and the first internet circuit connecting adapter 31 corresponding to the receiver, and calls up the receiver trading call terminal device 21 either connected to the circuit connecting unit 10 or connected through the trunk circuit 12 and the local line.

Thereafter, when the receiver responds, the call data is transmitted, and a call is connected between the terminal 22 and the terminal 21.

Moreover, when the user of a trading call terminal device 21 stored directly to the circuit control unit 10 leaves the office, the user may register data to the circuit control unit 10 ordering that the call received to the trading call terminal device 21 be transferred to the trading call terminal device 22 installed to the home of the user. When such order is registered, the circuit control unit 10 transfers the call to be received by the trading call terminal device 21L through the line circuit 11, the first internet circuit connecting adapter 31, the local area network 30, the terminal adapter or router 33, the internet 40, and the second internet circuit connecting adapter 41 to the trading call terminal device 22.

Accordingly, the call originally received at the local line may be received by the trading call terminal device 22 installed at the home of the user.

Moreover, the trading call terminal device 22 may call up another trading call terminal device through the local line by performing an opposite process.

As explained above, by utilizing the internet circuit, the information provided by the network server connected to a local area network (LAN) may be supplied to a circuit control unit or a trading call terminal device through remote control, and the trading call terminal device may be installed at home, enabling financial transactions and the like to be performed at home.

I claim:

1. A trading call system comprising:
   a circuit control unit;
   a plurality of trunk circuits connected to said circuit control unit;
   a plurality of telephone circuits connected to said trunk circuits;
   a plurality of line circuits connected to said circuit control unit;
   a plurality of first trading call terminals connected to first ones of said line circuits;
   a first internet circuit connecting adapter connected to a second one of said line circuits;
   a local area network connected to said circuit control unit through said first internet circuit connecting adapter;
   a network server connected to said local area network;
   a terminal adapter or router for connecting said local area network to an internet;
   a second internet circuit connecting adapter connected to the internet; and
   a plurality of second trading call terminals connected to said second internet circuit connecting adapter, wherein:
      said first internet circuit connecting adapter includes a circuit interface connected to a plurality of said first ones of said line circuits; a first local area network interface connected to said local area network; a first multiplexer for multiplexing data from said circuit interface and transmitting the multiplexed data to said first local area network interface, and a first expander for expanding data from said first local area network interface and transmitting the expanded data to said circuit interface; and
      said second internet circuit connecting adapter includes a call terminal interface connected to said plurality of second trading call terminals; a second local area network interface connected to the internet; a second expander for expanding data from said local area network interface and transmitting the expanded data to said call terminal interface, and a second multiplexer for multiplexing data from said call terminal interface and transmitting the multiplexed data to said second local area network interface;
      whereby said second trading call terminals are adapted to be connected to said circuit control unit through the internet.

2. A method of remote-controlling a call trading system, said trading call system including a circuit control unit; a plurality of trunk circuits connected to said circuit control unit; a plurality of telephone circuits connected to said trunk circuits; a plurality of line circuits connected to said circuit control unit; a plurality of first trading call terminals connected to first ones of said line circuits; a first internet circuit connecting adapter connected to a second one of said line circuits; a local area network connected to said circuit control unit through said first internet circuit connecting adapter; a network server connected to said local area network; a terminal adapter or router connecting said local area network to an internet; a second internet circuit connecting adapter connected to the internet; and a plurality of second trading call terminals connected to said second internet circuit connecting adapter, said method comprising:
   registering transfer location data of an incoming call in said circuit control unit; and
   transferring the incoming call through said local area network and the internet to a selected one of said second trading call terminal devices.

* * * * *